US006864966B2

(12) United States Patent  (10) Patent No.: US 6,864,966 B2
Giger  (45) Date of Patent: Mar. 8, 2005

(54) METHOD AND DEVICE FOR MEASURING DISTANCES (75) Inventor: Kurt Giger, Rüthi (CH)

(73) Assignee: Leica Geosystems AG, Heerbrugg (CH)

( * ) Notice: Subject to any disclaimer, the term of this patent is extended or adjusted under 35 U.S.C. 154(b) by 19 days.

(21) Appl. No.: 10/372,086

(22) Filed: Feb. 25, 2003

(65) Prior Publication Data
US 2003/0164938 A1 Sep. 4, 2003

Related U.S. Application Data (63) Continuation of application No. PCT/CH01/00491, filed on Oct. 8, 2001.

(30) Foreign Application Priority Data
Aug. 25, 2000 (CH) .............................................. 1668/00

(51) Int. Cl.[7] .............................................. G01C 3/08
(52) U.S. Cl. ..................................... 356/5.15; 356/5.01
(58) Field of Search ........................ 356/5.01, 4.01–5.15

(56) References Cited
U.S. PATENT DOCUMENTS
3,619,058 A * 11/1971 Hewlett et al.
3,652,161 A * 3/1972 Ross
5,745,437 A * 4/1998 Wachter et al.
5,889,490 A   3/1999 Wachter et al.

FOREIGN PATENT DOCUMENTS
DE   19643287   4/1998
EP   0738899    10/1996
EP   1012627    6/2000

* cited by examiner

Primary Examiner—Stephen C. Buczinski
(74) Attorney, Agent, or Firm—Burns, Doane, Swecker & Mathis, L.L.P.

(57) ABSTRACT

The invention relates to a method for measuring distances, based on the phase measurement of an optical measuring beam that is reflected or scattered by an object, on which the beam is sighted. According to said method, the measurement object is exposed to an optical measuring beam of modulated intensity emitted by a measuring device and is converted into electrical measurement signals. The signals are then compared with a reference signal that is generated from the detection and conversion of a portion of measuring light that has been guided on a known reference trajectory, in order to determine the distance between the measuring device and the measurement objet, based on the phase difference that has been determined. The emitted measuring beam is modulated in bursts and the measurement signal of the receiver is only evaluated during the active burst period. The invention also relates to devices for carrying out said method.

22 Claims, 4 Drawing Sheets

METHOD AND DEVICE FOR MEASURING DISTANCES

RELATED APPLICATIONS

This application claims priority under 35 U.S.C. §119 to Swiss Application 1668/00 filed in Switzerland on Aug. 25, 2000, and under 35 U.S.C. §120 to PCT/CH01/00491 filed as an International Application on Aug. 10, 2001, the entire contents of which are hereby incorporated by reference.

BACKGROUND

The invention relates to a method and a device for measuring.

Distance measuring devices of this generic type are well known in the prior art. They have a distance measurement range of several tens of meters and are often embodied as handheld devices. They are used primarily in construction surveying or in indoor construction, for instance for measuring rooms three-dimensionally. Other areas of use for distance measuring devices are geodetic and industrial measurement and surveying. The fundamental principle of distance measurement with the known devices is based on the evaluation of a changeover time in a characteristic variable of the electromagnetic radiation emitted by the device and remitted by an object aimed at. The distance measuring device is equipped for that purpose with an emitter for emitting an intensity-modulated beam. In handheld devices, this primarily involves an optical beam in the visible wavelength spectrum, to make it easier to aim at the measurement points. The optical beam is remitted or scattered by the measurement object aimed at and is recorded by a receiver built into the device. From the chronological delay in the received modulated beam compared to the beam emitted by the emitter, the distance from the measurement object is obtained.

As detectors in the known distance measuring devices, PIN photodiodes or avalanche photodiodes are typically used for converting the beam, remitted or scattered by the measurement object, into electrical signals. Distance measuring devices in which the distance determination is based on the measurement principle of phase measurement are quite common. In such devices, the electrical reception signal has a mixer frequency superimposed on it, directly at the avalanche photodiode or downstream of a preamplifier, to produce a low-frequency measurement signal. The phase of this low-frequency signal is determined and compared with the phase of a reference signal. The difference between the measured phase of the low-frequency measurement signal and the phase of the reference signal is a measure of the distance of the measurement object.

In European Patent Disclosure EP-B-0 738 899, the behavior of laser diodes for visible radiation and the attendant problems of accuracy in distance measurement are described. To improve the accuracy of the distance measurement, it is proposed there that the emitted laser radiation be modulated with pulse widths of less than 2 ns. The modulation frequency of this known device is in the range of approximately 50 MHz. In pulses with a pulse width of 1 ns, for instance, and a period duration of 20 ns, a pulse power of approximately 20 mW is required in these known devices, if a mean power of 1 mW, which is still permitted in class 2 lasers used in these devices is to be attained. The proposed type of modulation can still be converted with the commercially available 3 mW lasers, without having to make major sacrifices in terms of the service life of the lasers from the increased pulse power compared to the continuous 3 mW mode. By means of the brief pulses and the high pulse power, a short coherence length of the laser radiation is attained. The result is a reduction in the generally granular intensity distribution of the radiation remitted by the usually rough surface of the measurement object aimed at. Granular intensity distribution is also known as speckles and affects the measurement accuracy that can be attained. By reducing speckles in the remitted measuring beam striking the detector, a measurement accuracy in the millimeter range is attainable.

One possibility of improving the existing methods and devices is to increase the modulation frequency of the measuring beam still further. At higher frequencies, the signal steepness at the zero crossover is greater, and thus the time interval $\Delta t$ during which the intrinsic noise impairs the signal level is shortened. Shortening the time interval, however, has the disadvantage of reducing the measurement range within which the distance can be determined with the requisite accuracy. While at a modulation frequency of 50 MHz a distance of 3 m can be measured with the requisite accuracy, at a frequency of 400 MHz, for instance, the distance that can be measured with the requisite accuracy is only 37.5 cm. In distance measuring devices based on phase measurement, lower modulation frequencies of the measuring beam are additionally used for determining the approximate distance. At higher modulation frequencies for precision measurement therefore, increased effort and expense is required for measuring the approximate distance.

SUMMARY

While good results can already be obtained with the known distance measuring devices, there is nevertheless a need for further improvements in the power compared to the known distance measuring devices. The goal of such improvements are for instance shorter measuring times, more-accurate measuring devices, longer ranges, or a smaller structural size of the distance measuring devices by using smaller receiving optical elements. It is an object to simplify regulating the laser power and, with a view to embodying the distance measuring device as a battery-operated handheld device, to reduce the power consumption of the laser. A method and a device for distance measurement are to be created in which the further developments in semiconductor technology can be taken into account.

The method of the invention for measuring distances is based on the phase measurement of an optical measuring beam remitted or scattered by a measurement object aimed at. The measurement object is subjected to an intensity-modulated optical measuring beam emitted by a measuring device, and the measuring beam remitted or scattered by the measurement object is detected by a receiver disposed in the measuring device and converted into electrical measurement signals. The electrical measurement signals are then compared with a reference signal that is generated from the detection and conversion of a proportion of measured light carried through a known reference distance, in order to ascertain the distance between the measuring device and the measurement object from the phase difference ascertained. The emitted measuring beam is burst-modulated, and the measurement signal of the receiver is evaluated only during a period of time dependent on the active burst duration.

The active burst duration is the length of time during which the burst signal is present. The period of the sequence of bursts and idle time when there is no modulation signal is called the measuring period. The burst signal has a duty cycle that is defined as the ratio of the active burst duration to the measuring period in %. Thus the burst modulation differs from a pulse modulation, in which the modulation signal is present quasi-continuously over the total duration of one measuring period. In burst modulation, conversely, the modulation signal is present for only part of the measuring period. By the definition above, the duty cycle in pulse modulation is therefore always 100%, while in burst modulation the value is always less than 100%. The burst modulation is done with a preferably rectangularly modulated burst signal. The rectangularly modulated burst leads overall to a reduced peak power. The duty cycle, among others, is a measure of the attainable improvements in the signal-to-noise ratio (S/N). The burst signal has a modulation frequency that is dependent on the period of the signal course within one burst. By analogy with the active burst duration, an active modulation frequency can also be defined. It is dependent on the length of time during which the signal is other than zero. From the ratio of the active modulation frequency to the modulation frequency, a duty cycle of the modulation frequency can be determined in %.

By evaluating the measurement signal of the receiver only during the active burst duration, the signal- to-noise ratio (S/N) is improved. This will be explained taking as an example a laser of laser class 2 with a maximum mean output power of 1 mW. If, instead of the measuring beam with a 2.5 mW peak power that is emitted in the known devices, a laser burst with a 10% duty cycle, a peak power of 25 mW, and a modulation frequency of 400 MHz is projected, then once again a mean laser power of 1 mW is obtained. Because the reception signal is evaluated only during the active burst duration, the same total signal is obtained that would occur if a continuous signal were added up. However, because for 90% of the period no evaluation is done, 90% of the noise is also suppressed. The result is an improvement in the signal-to-noise ratio (S/N) by a factor of $\sqrt{(10)}$, that is, the square root of 10.

The burst modulation also makes regulating the laser power simpler and makes it possible to reduce the current consumption. Commercially available lasers of the kind used for instance in the known distance measuring devices have a threshold current (trigger current) at 25° C. of approximately 40 mA, at which the laser effect begins. Since losses occur in the laser collimator downstream of the laser diode, the laser power at the laser diode is not the same as the power, relevant to the laser class, at the laser exit window of the device. For a device of laser class 2 with an initial power of 1 mW, a trigger current of approximately 41 mA is required at 25° C. For an initial power of 10 mW, the trigger current is approximately 51 mA. If for a mean initial power of 1 mW a burst modulation of 10 mW with a duty cycle of 10% is now modulated, then a mean trigger current of approximately 5.1 mA is needed. Since the laser voltage at the higher current is greater by only approximately 10%, a reduction in the trigger current by approximately a factor of 9 is attained in this example.

Another advantage of burst modulation is that regulating the laser power is not critical. In devices of laser class 2, it must be assured that under all operating conditions of the laser, the mean laser power at the laser exit window of the device will not exceed 1 mW. Regulating the laser is usually done in such a way that a high-frequency modulation current is superimposed on a direct current. The laser power is regulated with the direct current. At a laser slope efficiency of approximately 1 mW/mA, the laser current for continuous operation and with a desired power accuracy of 2% at a mean initial power of 1 mA must be regulated precisely to approximately 20 μA. In the case of a burst modulation, of the kind described above, for the same power accuracy, the current has to be regulated to an accuracy of only approximately 200 μA. The requisite accuracy of the trigger current is reduced by the factor of the duty cycle of the burst modulation.

The burst modulation can be done with an active burst duration that is limited in practical terms to only a single peak. However, expediently, the active burst duration is selected such that a duty cycle results which is of approximately 5% to approximately 50%, preferably approximately 10% to approximately 40%. With the variables selected for the burst duration, adequate improvements compared to the known measuring methods are still attainable.

For the effect of the burst modulation, it proves advantageous if the emitted measuring beam is modulated with a modulation frequency greater than 100 MHz and a peak power greater than 10 mW. The higher peak powers of the laser in burst modulation also shorten the coherence length of the emitted laser radiation, since for the same pulse width but higher peak power, the laser leaps through multiple modes. This has a favorable effect on the accuracy of the measuring devices.

In a variant of the method of the invention, the electrical measurement signals are converted into low-frequency signals by continuous superposition of a high-frequency mixer frequency and are filtered only during the active burst duration. The mixer frequency can also be in the form of a burst. The mixer frequency is equivalent for instance to the value of the modulation frequency of the burst signal±the frequency value of the low-frequency signal. Noise can be filtered out with the analog low-frequency signal. In a preferred variant of the invention, filtering out the noise is performed after the digitizing of the low-frequency signal in a digital signal processor. The burst duration is advantageously selected as approximately one and a half period durations of the low-frequency measurement signal. The first third of the burst duration is needed to allow the filter to respond. The signal is then added up only during the following two-thirds of the burst duration, which make up one complete period of the low-frequency measurement signal. The burst frequency is advantageously selected as the frequency of the low-frequency measurement signal, divided by the factor of the duty cycle. Despite the fact that half the period of the low-frequency measurement signal is lost as a result of the transient effect of the filter, a sufficiently great improvement in the signal-to-noise ratio (S/N) is still attainable, and it can be improved still further by increasing the sampling frequency of the A/D converter and by optimizing the anti-aliasing filter used.

In an alternative variant embodiment of the invention, only during a period of time which amounts to approximately one to three times the active burst duration, the electrical measurement signal is superimposed by a high-frequency mixer frequency, which is present in the form of a burst and preferably is approximately equivalent to the burst frequency, and converted into low-frequency signals. The low-frequency measurement signals are then evaluated with regard to the phase displacement. The lengthened mixing duration compared to the burst duration takes into account the fact that the reception signal shifts relative to the emitted burst as a function of the distance to be measured. The burst frequency is selected to be greater than the frequency of the low-frequency signal. One advantage of this method is that the burst frequency can be selected as high enough that it can be used as an approximate frequency for determining the approximate distance.

In a further variant of the invention, the high-frequency electrical measurement signal furnished by the receiver is filtered and compared in the downstream signal evaluator with the reference signals and evaluated with regard to the phase displacement, in order from it to ascertain the distance sought. The noise is advantageously filtered out after the digitization of the high-frequency signals in the digital signal processor.

The distance measuring devices have the following characteristics in common with the distance measuring devices known from the closest prior art: an emitter for emitting an optical beam; a receiving optical element for the optical measuring beam remitted or scattered by a measurement object; a receiver, downstream of the receiving optical element, for converting the optical beam into electrical measurement signals; a device for generating a reference beam, which after traversing a known reference distance can be converted into electrical reference signals; a filter device for filtering out interfering signals; and a preferably digital signal processing system for examining the measurement signals and the reference signals as to their phase relationship, in order from that to determine the distance of the measurement object and make the result available to the user. The distance measuring devices of the invention have as their special feature the fact that the emitter is connected to a frequency synthesizer, with which the emitted optical beam can have a high-frequency, burst-modulated modulation frequency impressed on it; and that the evaluation of the electrical measurement signals and reference signals is coupled with the burst duration. This fundamental setup is common to all variants of the distance measuring devices of the invention that are based on phase measurement. The optical reference beam is generated for instance by a beam splitter, which splits the emitted optical beam into a measuring beam and a reference beam. A separate reference receiver is disposed in the beam path of the reference beam; it converts the reference beam, after it has traversed the reference distance, into electrical reference signals. However, the optical beam can also be carried periodically either to the measurement object or through the reference distance to the receiver. To that end, a deflection mirror that can be periodically pivoted into the beam path can for instance be used.

For the burst modulation, it appears expedient if as the emitter, a semiconductor laser diode for visible optical radiation is used, which preferably has a wavelength in the range from approximately 630 nm to approximately 650 nm. Such semiconductor laser diodes can be operated at the requisite mean initial powers and can in particular furnish the requisite pulse energies virtually without sacrifices in terms of service life.

Because the filter device includes at least one high-frequency filter, which is disposed upstream of the signal processing system in the electrical signal path, it is possible to dispense with conversion into low-frequency signals. The noise is filtered out directly at the high-frequency measurement signal or reference signal. The filtered signals are then processed further in the signal processing system.

In an alternative variant embodiment of the invention, a respective frequency mixer is provided in the electrical signal path of both the measurement signal and the reference signal. The frequency mixer is disposed upstream of the filter device and serves to superimpose a high-frequency mixer frequency on the high-frequency electrical measurement signals and reference signals. Because of the superposition of the high-frequency mixer frequency on the high-frequency measurement signals and reference signals, low-frequency measurement signals and reference signals occur that are freed of noise in one or more downstream low-frequency filters. The filtered, low-frequency signals are then digitized and processed further in the signal processing system, in order for the distance from the measurement object to be determined from the phase relationships. An anti-aliasing filter is preferably used as the low-frequency filter.

BRIEF DESCRIPTION OF THE DRAWINGS

The invention will be described in further detail below in terms of exemplary embodiments shown schematically in the drawings. Shown are.

DETAILED DESCRIPTION OF THE PREFERRED EMBODIMENTS

Figures 1, 2:
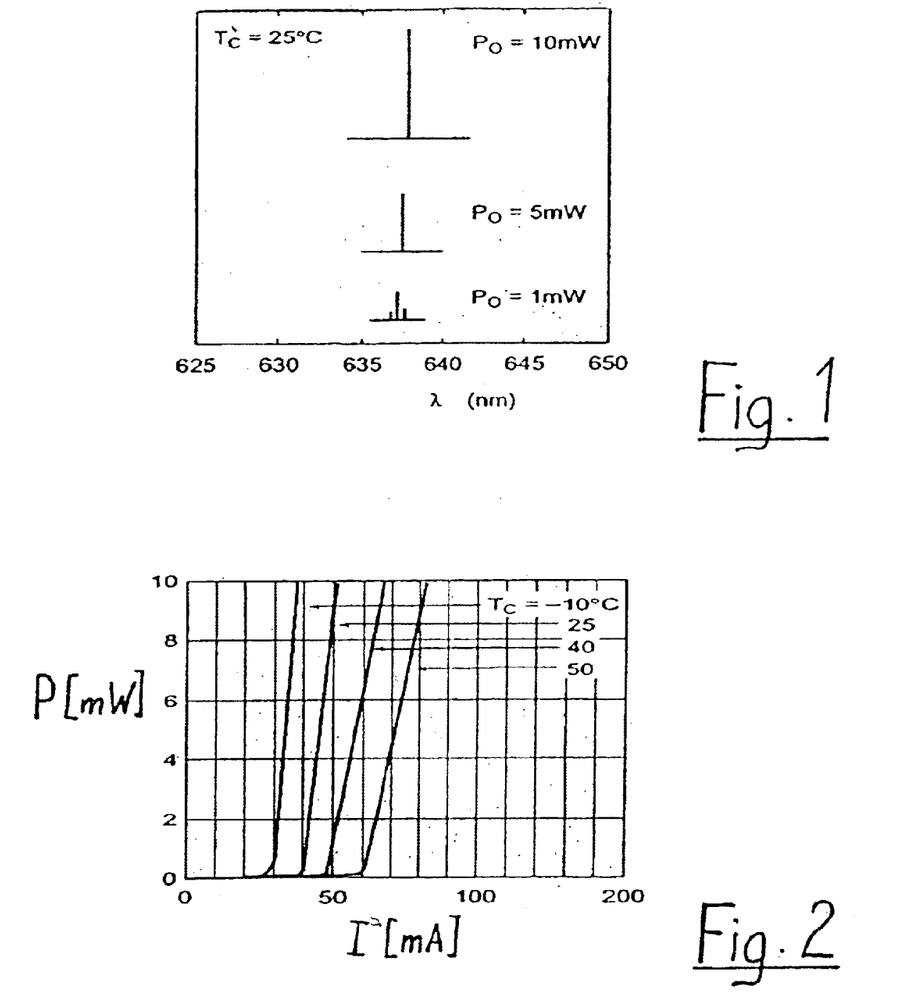
FIGS. 1–3, graphs to explain characteristic variables of laser diodes.

FIG. 1 shows the dependency of the light wavelength on the initial power of a laser diode. For the same pulse width and higher peak powers, the laser leaps through multiple modes. This shortens the coherence length of the projected laser light, which has a positive effect on the accuracy of the measuring devices equipped with the laser. Progress in semiconductor technology makes it possible to generate and process signals at ever-higher frequencies. In distance measuring devices, this improved technology can be employed to improve the power of the devices. The improvements can take the form of shorter measuring times, more-precise measuring devices, longer ranges, or smaller and smaller devices and hence smaller receiving optical elements with lower reception signal levels. At higher frequencies, the signal has a greater slope at the zero crossover. This shortens the period of time within which the noise signals impair the actual measurement signal.

FIG. 2 shows the triggering characteristic of a semiconductor laser at various temperatures. For a mean initial power of 1 mW, the laser at 25° C. has a trigger current of approximately 41 mA. Because of the steepness of the trigger characteristic, the trigger current for an initial power of 10 mW is approximately 51 mA. Increasing the mean initial power of the laser by a factor of ten results in a trigger current increased by only approximately 10 mA. At the increased trigger current, the laser voltage is only approximately 10% higher.

Figure 3:
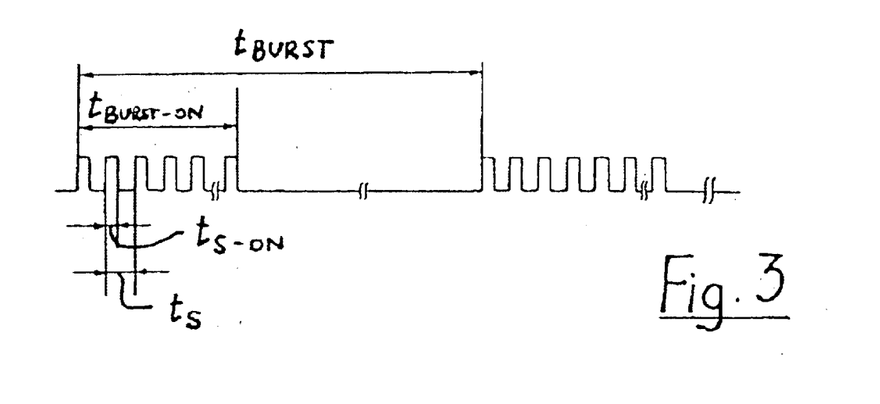

FIG. 3 serves to illustrate characteristic variables for the burst modulation according to the invention of the emitted optical beam. The period of time during which the burst signal sequence S is applied is called the active burst duration $t_{BURST-ON}$. The period of the sequence of bursts and idle time when there is no modulation signal is called the measuring period $t_{BURST}$. The burst signal has a duty cycle that is defined as the ratio of the active burst duration $t_{BURST-ON}$ to the measuring period $t_{BURST}$ in %. Thus the burst modulation differs from a pulse modulation, in which the modulation signal is present quasi-continuously over the total duration of one measuring period. In burst modulation, conversely, the modulation signal is present for only part of the measuring period. By the definition above, the duty cycle in pulse modulation is therefore always 100%, while in burst modulation the value is always less than 100%. The burst modulation is done with a preferably rectangularly modulated burst signal S. The rectangularly modulated burst signal S leads overall to a reduced peak power. The duty cycle, among others, is a measure of the attainable improvements in the signal-to-noise ratio (S/N). The burst signal has a modulation frequency M that is dependent on the period $t_S$ of the signal course within one burst. By analogy with the active burst duration, an active modulation frequency $M_{ON}= 1/t_{S-ON}$ can also be defined. It is dependent on the length of time during which the signal is other than zero. From the ratio of the active modulation frequency to the modulation frequency, a duty cycle of the modulation frequency can be determined in %.

Figure 4:
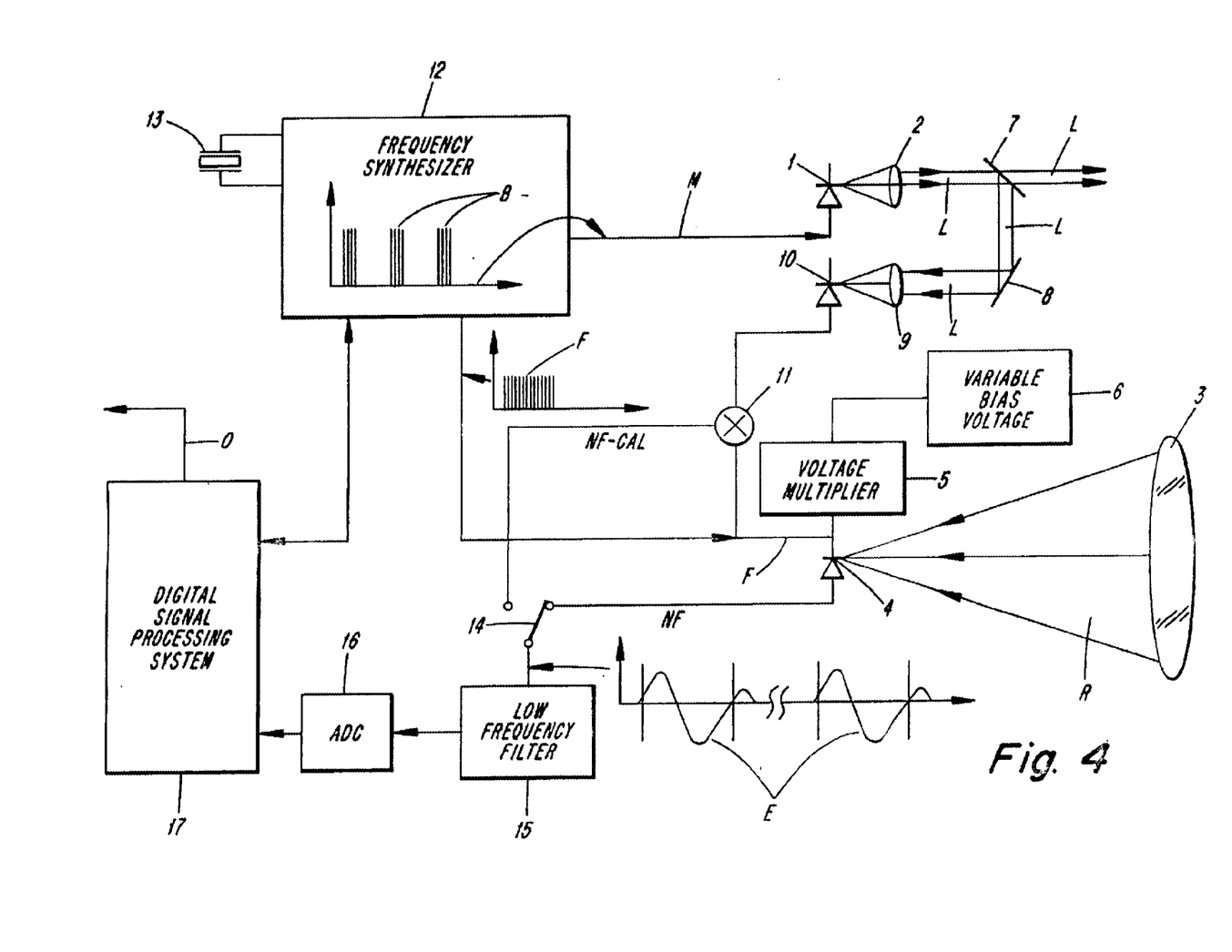
FIGS. 4–6, three schematic illustrations for explaining the function of exemplary variants of distance measuring devices.

FIG. 4 is a schematic illustration of a first variant of the distance measuring device of the invention. The optical beam L emitted by a laser source 1 and collimated by a collimating optical element 2 is split by a beam splitter 7 into a measuring beam and a reference beam. The measuring beam reaches a measurement object whose distance from the distance measuring device is to be measured. The beam R remitted or scattered by the measurement object is collected by a receiving optical element 3 and carried to a measuring receiver 4. An avalanche photodiode is for instance used as the measuring receiver 4; via a voltage multiplier 5, it is connected to a variable bias voltage 6. The reference beam is carried to a reference receiver via a deflection mirror 8 and an optical element 9. The distance traveled by the reference beam from the beam splitter 7 to the reference receiver 10 forms the known reference distance.

A high-frequency modulation frequency M, which is generated by a frequency synthesizer 12 that is triggered by a reference quartz oscillator 13, is impressed on the optical radiation emitted by the laser source 1. As a result of the high-frequency modulation frequency M, respective high-frequency measurement signals are generated at the receiver 4 and at the reference receiver 10. The frequency synthesizer 12 also generates a mixer frequency F of similarly high frequency, which is simultaneously delivered via a connecting line to a frequency mixer 11 and to the receiver 4. The receiver 4 for the radiation remitted or scattered by the measurement object is embodied as an avalanche photodiode and therefore operates as a direct mixer. In the event that a PIN diode is used instead of the avalanche diode, one additional frequency mixer is needed, in which the mixer frequency F is superimposed with the measurement signals. As a result of the superposition with the mixer frequency F, the measurement signals generated by the receiver 4 are converted into a low-frequency measurement signal NF. Analogously, the high-frequency reference signals are superimposed in the frequency mixer 11 with the mixer frequency F to form a low-frequency calibration signal NF-CAL. The mixer frequency F is advantageously selected such that $F=(n \times M) \pm NF$. The mixer frequency F is thus an integral multiple of the modulation frequency M, plus or minus the value of the low-frequency signal NF. Here, n is greater than 0.

The low-frequency measurement signals NF and calibration signals NF-CAL are delivered sequentially, via an analog switch 14, to a low-frequency filter 15, in which the high-frequency signal components are filtered out. Preferably, the filter is an anti-aliasing filter. The filtered and amplified measurement signals and reference signals are digitized in an analog/digital converter 16 and evaluated in terms of their phase relationship in a digital signal processing system 17. From the phase relationship, a conclusion is drawn as to the distance of the measurement object, and this is carried on as signal O to an output unit.

The modification according to the invention of the distance measuring device comprises the modulation frequency M, generated by the frequency synthesizer 12, that is impressed on the optical beam L emitted by the laser source 1. In particular, this involves a burst modulation with bursts B, whose burst frequency is low compared to the frequency of the low-frequency measurement signals NF. The measuring beam L output as a consequence of the burst modulation in bursts B is periodically replaced by relatively long idle time segments. The result is measurement signals NF and reference signals NF-CAL that are separated from one another by long segments without measurement signals. The evaluation of the low-frequency measurement signals NF and reference signals NF-CAL in the digital signal processing system 17 is likewise controlled by the frequency synthesizer and is done essentially only during a measuring period E that is dependent on the burst duration. The mixer frequency F also generated by the frequency synthesizer 12 can be generated continuously. Alternatively, it can be in the form of a burst, whose frequency is in the range of the modulation frequency impressed on the optical beam.

Figure 5:
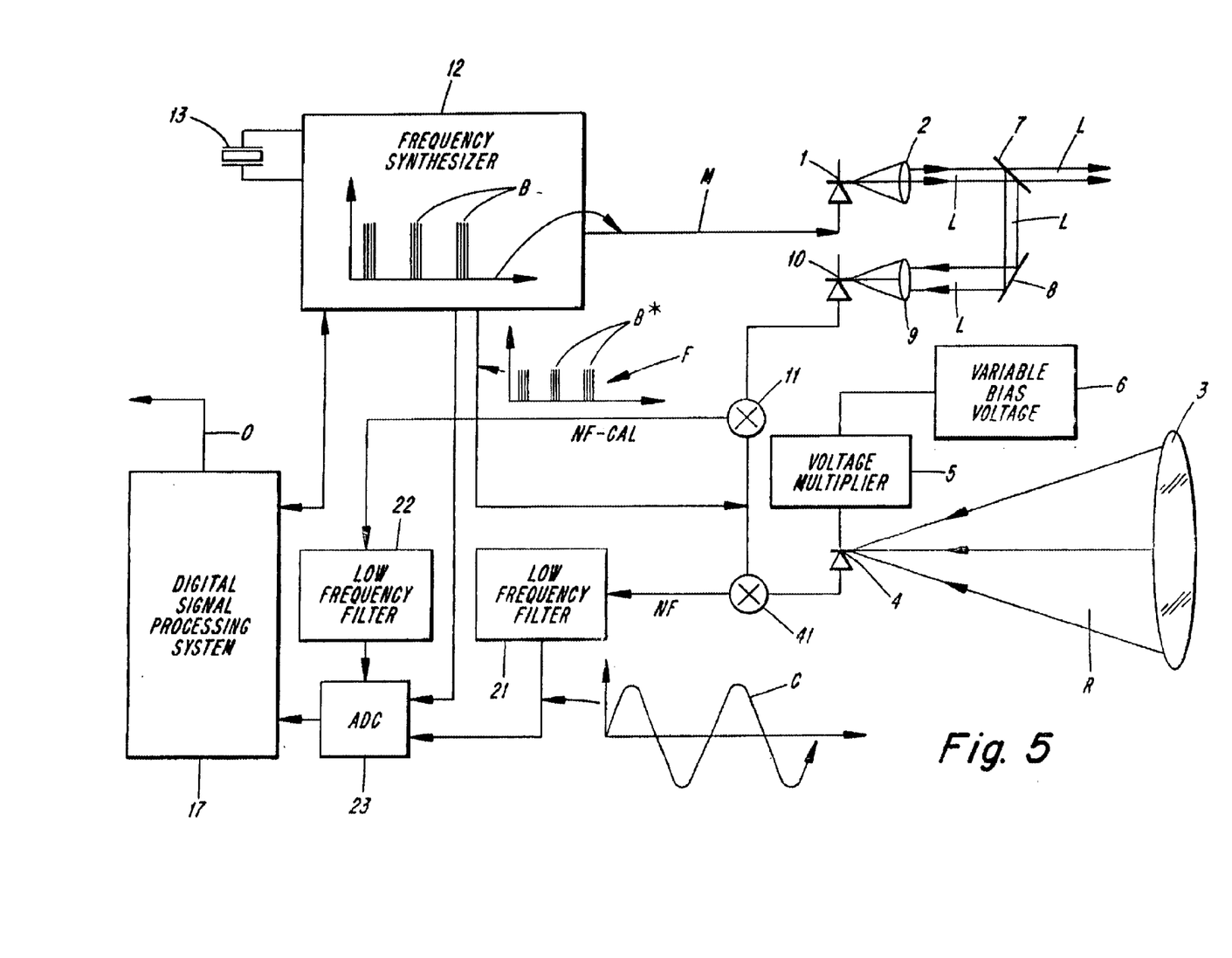

The exemplary embodiment shown schematically in FIG. 5 has essentially the same layout in the emission and reception regions as the exemplary embodiment of FIG. 4. Analogous components are therefore identified by the same reference numerals. The optical beam L emitted by a laser source 1 and collimated by a collimating optical element 2 is split by a beam splitter 7 into a measuring beam and a reference beam. The measuring beam reaches a measurement object whose distance from the distance measuring device is to be measured. The beam R remitted or scattered by the measurement object is collected by a receiving optical element 3 and carried to a measuring receiver 4. An avalanche photodiode is for instance used as the measuring receiver 4; via a voltage multiplier 5, it is connected to a variable bias voltage 6. The reference beam is carried to a reference receiver via a deflection mirror 8 and an optical element 9. The distance traveled by the reference beam from the beam splitter 7 to the reference receiver 10 forms the known reference distance.

A high-frequency modulation frequency M, which is generated by a frequency synthesizer 12 that is triggered by a reference quartz oscillator 13, is impressed on the optical radiation emitted by the laser source 1. As a result of the high-frequency modulation frequency M, respective high-frequency measurement signals are generated at the receiver 4 and at the reference receiver 10. The frequency synthesizer 12 also generates a mixer frequency F of similarly high frequency, which is simultaneously delivered via a connecting line to a frequency mixer 11 and to an additional downstream frequency mixer 41. The mixer frequency F is superimposed on the measurement signal, generated by the receiver 4, in the additional, downstream frequency mixer 41. As a result of the superposition with the mixer frequency F, the measurement signals generated by the receiver 4 are converted into a low-frequency measurement signal NF. Analogously, the high-frequency reference signals are superimposed in the frequency mixer 11 with the mixer frequency F to form a low-frequency calibration signal NF-CAL.

The low-frequency measurement signals NF and calibration signals NF-CAL are delivered each to a respective low-frequency filter 21, 22 in which the high-frequency signal components are filtered out. Preferably, both filters are anti-aliasing filters. The filtered and amplified measurement signals and reference signals are digitized in an analog/digital converter 23 equipped with two inputs and evaluated in terms of their phase relationship in a digital signal processing system 17. The low-frequency measurement signals and the reference signals can be evaluated either simultaneously or sequentially. From the phase relationship, a conclusion is drawn as to the distance of the measurement object, and this is carried on as signal O to an output unit.

The modulation frequency M generated by the frequency synthesizer 12, which is impressed on the optical beam L emitted by the laser source 1, is burst-modulated. As a result, the measuring beam is output in bursts B, whose burst frequency is high compared to the frequency of the low-frequency measurement signals NF. The measuring beam L output in bursts B is periodically replaced by relatively long idle time segments. The result is measurement signals NF that are separated from one another by long segments without a measurement signal. The mixer frequency F also generated by the frequency synthesizer 12 is likewise in the form of bursts B*, and it has a frequency that is in the range of the modulation frequency M impressed on the optical beam S. The mixing of the high-frequency signals of the receiver 4 and of the reference receiver 10 with the mixer frequency F is effected only during a period of time that is dependent on the burst-modulated. The evaluation of the continuous low-frequency signals C present downstream of the low-frequency filters 21, 22 is done after they have been digitized in the digital signal processing system 17. This system is coupled with the frequency synthesizer 12 and evaluates the signals during a period of time that is dependent on the burst-modulated.

Figure 6:
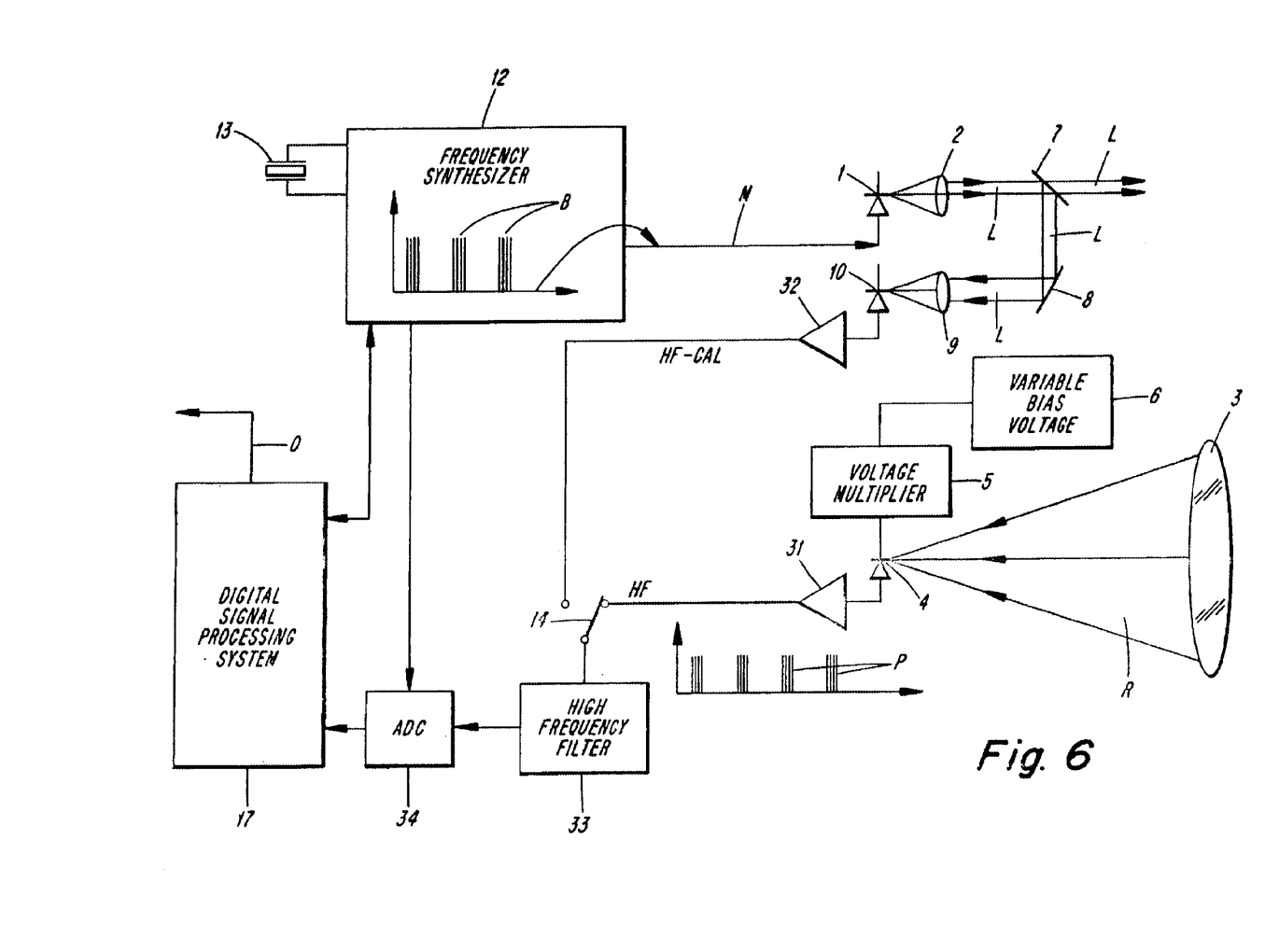

The exemplary embodiment of the invention shown in FIG. 6 dispenses with the conversion of the high-frequency measurement signals or reference signals into low-frequency signals, and it processes the high-frequency signals directly. The basic layout of the emission and reception region is largely equivalent to that of the exemplary embodiments described above. Identical components are therefore also identified by the same reference numerals. The optical beam L emitted by a laser source 1 and collimated by a collimating optical element 2 is split by a beam splitter 7 into a measuring beam and a reference beam. The measuring beam reaches a measurement object whose distance from the distance measuring device is to be measured. The beam R remitted or scattered by the measurement object is collected by a receiving optical element 3 and carried to a measuring receiver 4. An avalanche photodiode is for instance used as the receiver 4; via a voltage multiplier 5, it is connected to a variable bias voltage 6. The reference beam is carried to a reference receiver via a deflection mirror 8 and an optical element 9. The distance traveled by the reference beam from the beam splitter 7 to the reference receiver 10 forms the known reference distance.

A high-frequency modulation frequency M, which is generated by a frequency synthesizer 12 that is triggered by a reference quartz oscillator 13, is impressed on the optical radiation emitted by the laser source 1. The modulation frequency M is burst-modulated B, with the effect that the optical beam S is projected in packets. Downstream of the receiver 4 and the reference receiver 10 disposed in the reference beam path is a respective amplifier 31, 32, which amplifies the high-frequency measurement signals HF and reference signals HF-CAL. Since the high-frequency measurement signals HF and reference signals HF-CAL do not have a mixer frequency superimposed on them, they too are in packet form P, corresponding to the burst modulation of the emitted optical beam L. The high-frequency measurement signals HF and reference signals HF-CAL are carried sequentially via a switch 14 to a high-frequency filter 33. A bandpass filter can be considered, for example, as the high-frequency filter. The high-frequency filter is followed by a fast analog/digital converter 34, which converts the measurement signals and reference signals into digital signals, which are then evaluated as to their phase relationship in a digital signal processing system 17. The A/D converter 34 and the digital signal processing system 17 each derive their clock speed from the frequency synthesizer and as a function of the burst-modulated. From the phase relationship, the sought distance O from the measurement object sought is determined, and the information is forwarded to an output device, such as a display or a printer. The measurement signals HF and reference signals HF-CAL can also be digitized and evaluated simultaneously. In that case, an high-frequency filter is required for each of the two signal paths. The conversion of the analog signals into digital signals can be done in a common A/D converter with two inputs, or separate A/D converters can be provided.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for measuring distances using phase measurement of an optical measuring beam remitted or scattered by an object that is aimed at, comprising:

subjecting a measurement object to an intensity-modulated optical measuring beam emitted by a measuring device;

detecting a measuring beam remitted or scattered by the measurement object by a receiver disposed in the measuring device;

converting the detected measuring beam into an electrical measurement signal, which is compared with a reference signal generated from the detection and conversion of a proportion of measured light carried through a known reference distance; and ascertaining from a phase difference, a distance between the measuring device and the measurement object, wherein the emitted measuring beam is burst-modulated, and the measurement signal of the receiver is evaluated during a period of time dependent only on an active burst duration.

2. The method of claim 1, wherein the active burst duration is selected such that a duty cycle of approximately 5% to approximately 50%, is attained.

3. The method of claim 2, wherein the emitted measuring beam is modulated with a modulation frequency greater than 100 MHz and a peak power greater than 10 mW.

4. The method of one of claim 3, wherein the electrical measurement signal is converted into low-frequency measurement signal by continuous superposition of a high-frequency mixer frequency and are evaluated only during the active burst duration.

5. The method of claim 4, wherein the active burst duration is selected as approximately one and a half period durations of the low-frequency measurement signal.

6. The method of claim 5, wherein a burst frequency is selected as a frequency of the low-frequency measurement signal, divided by a value of a duty cycle of the active burst duration.

7. The method of claim 3, wherein during a time period which amounts to approximately one to three times the active burst duration, the electrical measurement signal is superimposed by a high-frequency mixer frequency and converted into low-frequency measurement signals, and the low-frequency measurement signals are evaluated with regard to the phase difference.

8. The method of claim 4, wherein the mixer frequency is selected as n times a burst frequency±a value of the low-frequency measurement signal, and n is an integer and is greater than zero.

9. The method of claim 3, wherein during a period of time that amounts to approximately one to three times the active burst duration, a high-frequency electrical measurement signal furnished by the receiver is filtered and compared in a signal evaluator with the reference signal and evaluated with regard to the phase difference to ascertain the distance.

10. The method of claim 7, wherein a burst frequency is used as an approximate frequency to determine an approximate distance.

11. The method of claim 1, wherein the active burst duration is selected such that a duty cycle of approximately 10% to approximately 40%, is attained.

12. The method of claim 1, wherein the emitted measuring beam is modulated with a modulation frequency greater than 100 MHz and a peak power greater than 10 mW.

13. The method of claim 1, wherein the electrical measurement signal is converted into low-frequency measurement signal by continuous superposition of a high-frequency mixer frequency and are evaluated only during the active burst duration.

14. The method of claim 1, wherein during a time period which amounts to approximately one to three times the active burst duration, the electrical measurement signal is superimposed by a high-frequency mixer frequency and converted into low-frequency measurement signals, and the low-frequency measurement signals are evaluated with regard to the phase difference.

15. The method of claim 1, wherein during a period of time that amounts to approximately one to three times the active burst duration, a high-frequency electrical measurement signal furnished by the receiver is filtered and compared in a signal evaluator with the reference signal and evaluated with regard to the phase difference to ascertain the distance.

16. The method of claim 9, wherein a burst frequency is used as an approximate frequency to determine an approximate distance.

17. A device for measuring distances using phase measurement, comprising:

an emitter for emitting an optical beam (L);
a receiving optical element for receiving an optical measuring beam (R) remitted or scattered by a measurement object;
a receiver connected downstream of the receiving optical element for converting the optical measuring beam into an electrical measurement signal;
a filter device for filtering out interfering signals; and
a signal processing system for comparing the measurement signal with a reference signal and examining a phase relationship to determine a distance of the measurement object, wherein the emitter is connected to a frequency synthesizer with which a high-frequency, burst-modulated modulation frequency (M) can be impressed on the emitted optical beam (L) and wherein evaluation of the electrical measurement signal and reference signal is coupled with an active burst duration ($t_{BURST-ON}$).

18. The device of claim 17, wherein the emitter is a semiconductor laser diode for a visible optical beam (L), which has a wavelength in the range from approximately 630 nm to approximately 650 nm.

19. The device of claim 18, comprising:
a device in a beam path of the emitted optical beam (L), which from the emitted optical beam (L) generates an optical reference beam that can be carried through a known reference distance before being converted into the reference signal.

20. The device of claim 19, wherein the device for generating the reference beam is a beam splitter, and a reference receiver is disposed in a beam path of the reference beam.

21. The device of claim 17, wherein the filter device includes:
at least one high-frequency filter, which is disposed upstream of the signal processing system in an electrical signal path.

22. The device of claim 17, comprising:
a device in a beam path of the emitted optical beam (L), which from the emitted optical beam (L) generates an optical reference beam that can be carried through a known reference distance before being converted into the reference signal.

* * * * *